United States Patent
Thomas (10) Patent No.: US 9,009,436 B2
(45) Date of Patent: Apr. 14, 2015

(54) FLUSHED DATA ALIGNMENT WITH PHYSICAL STRUCTURES

(75) Inventor: Nicholas James Thomas, Dundee (GB)

(73) Assignee: SanDisk Technologies, Inc., Plano, TX (US)

( * ) Notice: Subject to any disclaimer, the term of this patent is extended or adjusted under 35 U.S.C. 154(b) by 692 days.

(21) Appl. No.: 13/206,266

(22) Filed: Aug. 9, 2011

(65) Prior Publication Data

US 2013/0042067 A1  Feb. 14, 2013

(51) Int. Cl.
G06F 12/00 (2006.01)
G06F 12/08 (2006.01)
G06F 12/02 (2006.01)
G06F 13/00 (2006.01)
G06F 13/28 (2006.01)

(52) U.S. Cl.
CPC ........ G06F 12/0866 (2013.01); G06F 12/0207 (2013.01); G06F 12/0246 (2013.01); G06F 2212/214 (2013.01)

(58) Field of Classification Search
CPC ............ G06F 12/0868; G06F 12/0873; G06F 12/0607
USPC .................. 711/103, 135, 157, 168
See application file for complete search history.

(56) References Cited

U.S. PATENT DOCUMENTS

| | | | |
|---|---|---|---|
| 6,725,321 B1 | 4/2004 | Sinclair et al. | |
| 7,461,199 B2 | 12/2008 | Conley et al. | |
| 7,743,191 B1 | 6/2010 | Liao | |
| 7,847,283 B2 | 12/2010 | Zhang | |
| 8,601,219 B2 * | 12/2013 | Yano et al. ................ | 711/135 |
| 2003/0163630 A1 * | 8/2003 | Aasheim et al. ............ | 711/103 |
| 2010/0100673 A1 | 4/2010 | Cheriton | |

OTHER PUBLICATIONS

Caulfield, Adrian M. et al., *Gordon: Using Flash Memory to Build Fast, Power-efficient Clusters for Data-intensive Applications*, ASPLOS '09, Mar. 7-11, 2009, Washington, D.C., pp. 217-228.

* cited by examiner

*Primary Examiner* — Yaima Rigol
*Assistant Examiner* — Mark Giardino, Jr.
(74) *Attorney, Agent, or Firm* — Brinks, Gilson & Lione (57) ABSTRACT

A method and system are disclosed herein for performing operations on a parallel programming unit in a memory system. The parallel programming unit includes multiple physical structures (such as memory cells in a row) in the memory system that are configured to be operated on in parallel. The method and system perform a first operation on the parallel programming unit, the first operation operating on only part of the parallel programming unit and not operating on a remainder of the parallel programming unit, set a pointer to indicate at least one physical structure in the remainder of the parallel programming unit, and perform a second operation using the pointer to operate on no more than the remainder of the parallel programming unit. In this way, the method and system may realign programming to the parallel programming unit when partial writes to the parallel programming unit occur.

16 Claims, 6 Drawing Sheets

FLUSHED DATA ALIGNMENT WITH PHYSICAL STRUCTURES

TECHNICAL FIELD

This application relates generally to managing data in a memory system. More specifically, this application relates to the operation of a memory system to more efficiently program the memory system in parallel.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device.

Programming of data into the flash memory takes a certain amount of time. To more efficiently program the flash memory, a large number of memory cells are programmed at the same time. In this way, parallel programming of the flash memory improves its performance and enables the flash memory to achieve high write speed.

BRIEF SUMMARY

Methods and systems are disclosed herein for performing operations on a parallel programming unit in a memory system. The parallel programming unit includes multiple physical structures (such as memory cells in a row) in the memory system that are configured to be operated on in parallel (such as a parallel write operation or a parallel read operation).

According to a first aspect, a method for performing operations on the parallel programming unit in the memory system is disclosed. The method includes: performing a first operation on the parallel programming unit, the parallel programming unit comprising multiple physical structures configured to be operated on in parallel, the first operation operating on only some of the multiple physical structures in the parallel programming unit and not operating on a remainder of the parallel programming unit; setting a pointer to indicate at least one physical structure in the remainder of the parallel programming unit; and performing a second operation using the pointer to operate on no more than the remainder of the parallel programming unit. In this way, the method may realign programming to the parallel programming unit when partial writes to the parallel programming unit occur.

According to another embodiment, a storage device is disclosed. The storage device includes a non-volatile memory configured to be programmed in a parallel programmable unit and a controller in communication with the non-volatile memory. The controller configured to: perform a first operation on the parallel programming unit, the first operation operating on only some of the multiple physical structures in the parallel programming unit and not operating on a remainder of the parallel programming unit; set a pointer to indicate at least one physical structure in the remainder of the parallel programming unit; and perform a second operation using the pointer to operate on no more than the remainder of the parallel programming unit.

Other features and advantages will become apparent upon review of the following drawings, detailed description and claims. Additionally, other embodiments are disclosed, and each of the embodiments can be used alone or together in combination. The embodiments will now be described with reference to the attached drawings.

DETAILED DESCRIPTION

Figure 1:
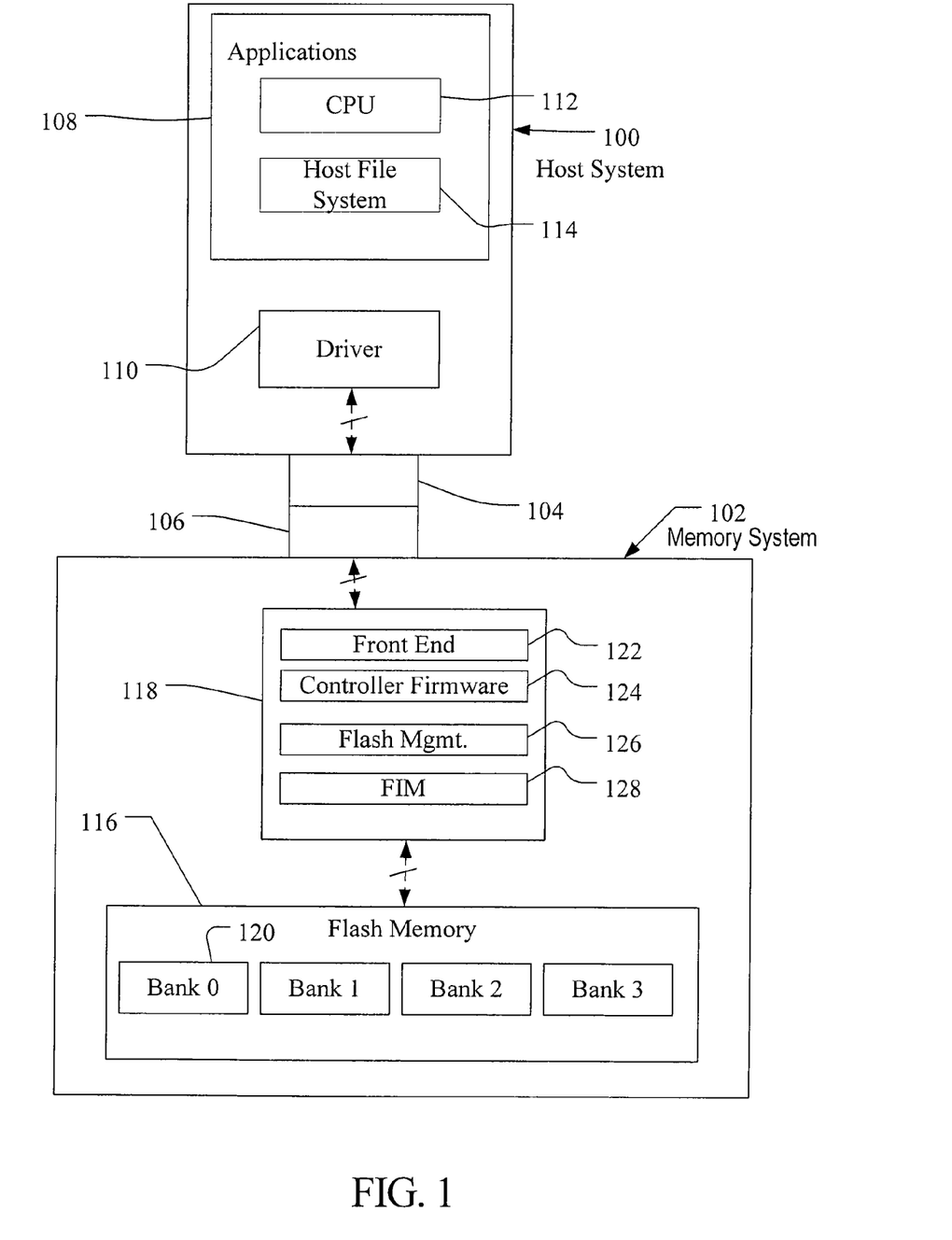
FIG. 1 illustrates a host connected with a memory system having multi-bank non-volatile memory.

A flash memory system suitable for use in implementing aspects of the invention is shown in FIGS. 1-6. A host system 100 of FIG. 1 stores data into and retrieves data from a memory system 102. The memory system may be flash memory embedded within the host, such as in the form of a solid state disk (SSD) drive installed in a personal computer. Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory system 102 is concerned, made up of a combination of circuitry and software. They are an applications portion 108 and a driver portion 110 that interfaces with the memory system 102. In a PC, for example, the applications portion 110 can include a processor 112 running word processing, graphics, control or other popular application software, as well as the file system 114 for managing data on the host 100. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as a multi-bank flash memory 116, and a system controller 118 that both interfaces with the host 100 to which the memory system 102 is connected for passing data back and forth and controls the memory 116. The system controller 118 may convert between logical addresses of data used by the host 100 and physical addresses of the multi-bank flash memory 116 during data programming and reading. The multi-bank flash memory 116 may include any number of memory banks 120, with four memory banks shown in FIG. 1 simply by way of illustration. Functionally, the system controller 118 may include a front end 122 that interfaces with the host system, controller logic 124 for coordinating operation of the memory 116, flash management logic 126 for internal memory management operations such as system initiation, writing data within a block, bad block management and handling block linkage information, as well as one or more flash interface modules (FIMs) 128 to provide a communication interface between the controller with the flash memory 116.

Figure 2:
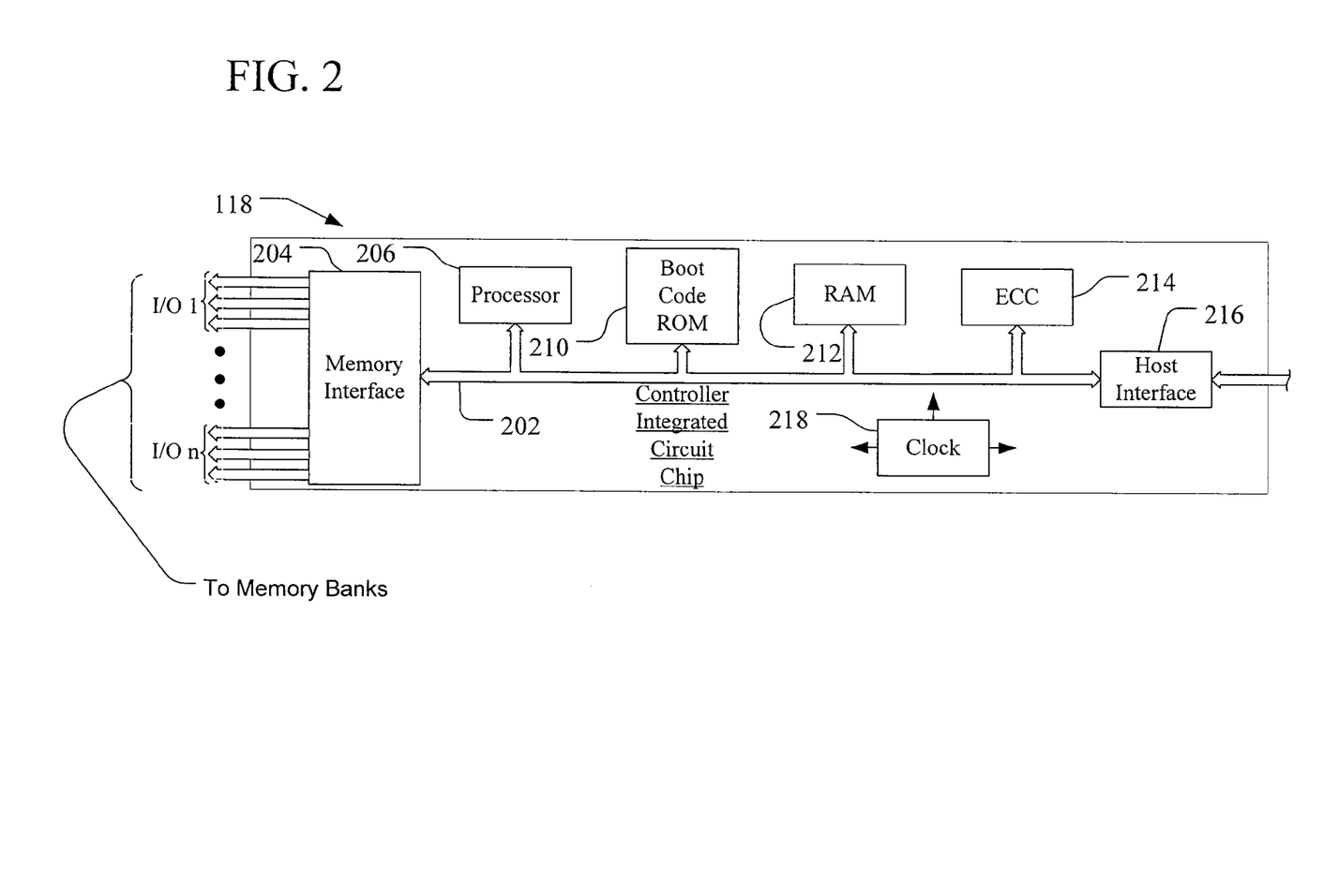
FIG. 2 is an example block diagram of an example flash memory system controller for use in the multi-bank non-volatile memory of FIG. 1.

The system controller 118 and may be implemented on a single integrated circuit chip, such as an application specific integrated circuit (ASIC) such as shown in FIG. 2. The processor 206 may comprise a microprocessor, a microcontroller, an application specific integrated circuit (ASIC), a field programmable gate array, a logical digital circuit, or other now known or later developed logical processing capability. For example, the processor 206 of the system controller 118 may be configured as a multi-thread processor capable of communicating separately with each of the respective memory banks 120 via a memory interface 204 having I/O ports for each of the respective banks 120 in the multi-bank flash memory 116. The system controller 118 may include an internal clock 218. The processor 206 communicates with an error correction code (ECC) module 214, a RAM buffer 212, a host interface 216, and boot code ROM 210 via an internal data bus 202.

Figure 3:
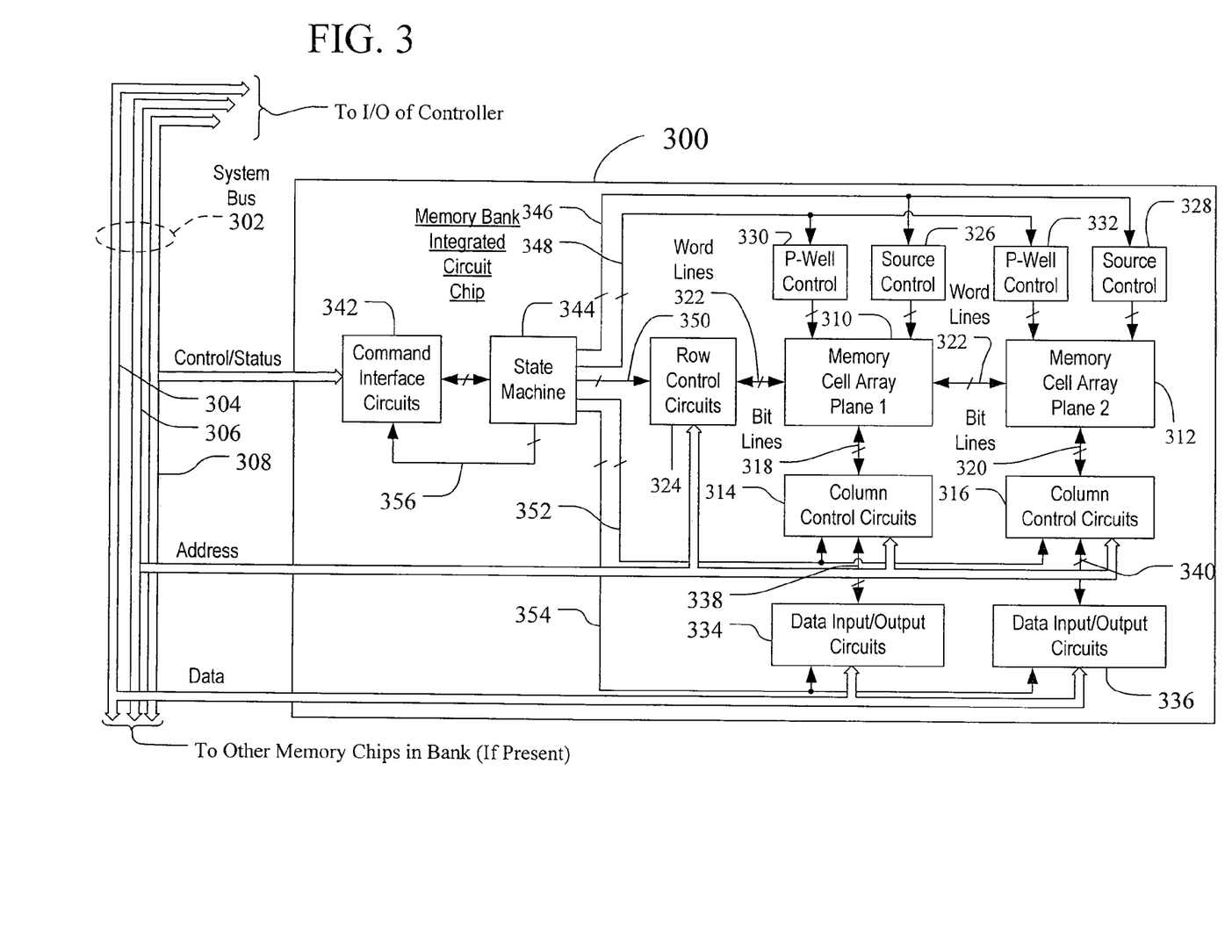
FIG. 3 is an example one flash memory bank suitable as one of the flash memory banks illustrated in FIG. 1.

Each bank 120 in the multi-bank flash memory 116 may consist of one or more integrated circuit chips, where each chip may contain an array of memory cells organized into multiple planes. An illustration of a memory bank 300 on a single chip is shown in FIG. 3. The memory bank 300 of FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address portion 306 of the system bus 302. Source voltage control circuits 326 and 328 are also connected with the respective planes, as are p-well voltage control circuits 330 and 332. If the bank 300 is in the form of a memory chip with a single array of memory cells, and if two or more such chips exist in the system, the array of each chip may be operated similarly to a plane within the multi-plane chip described above.

Data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Each memory chip in each bank 120 contains controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other non-volatile memory architectures or technologies, alone or combination, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
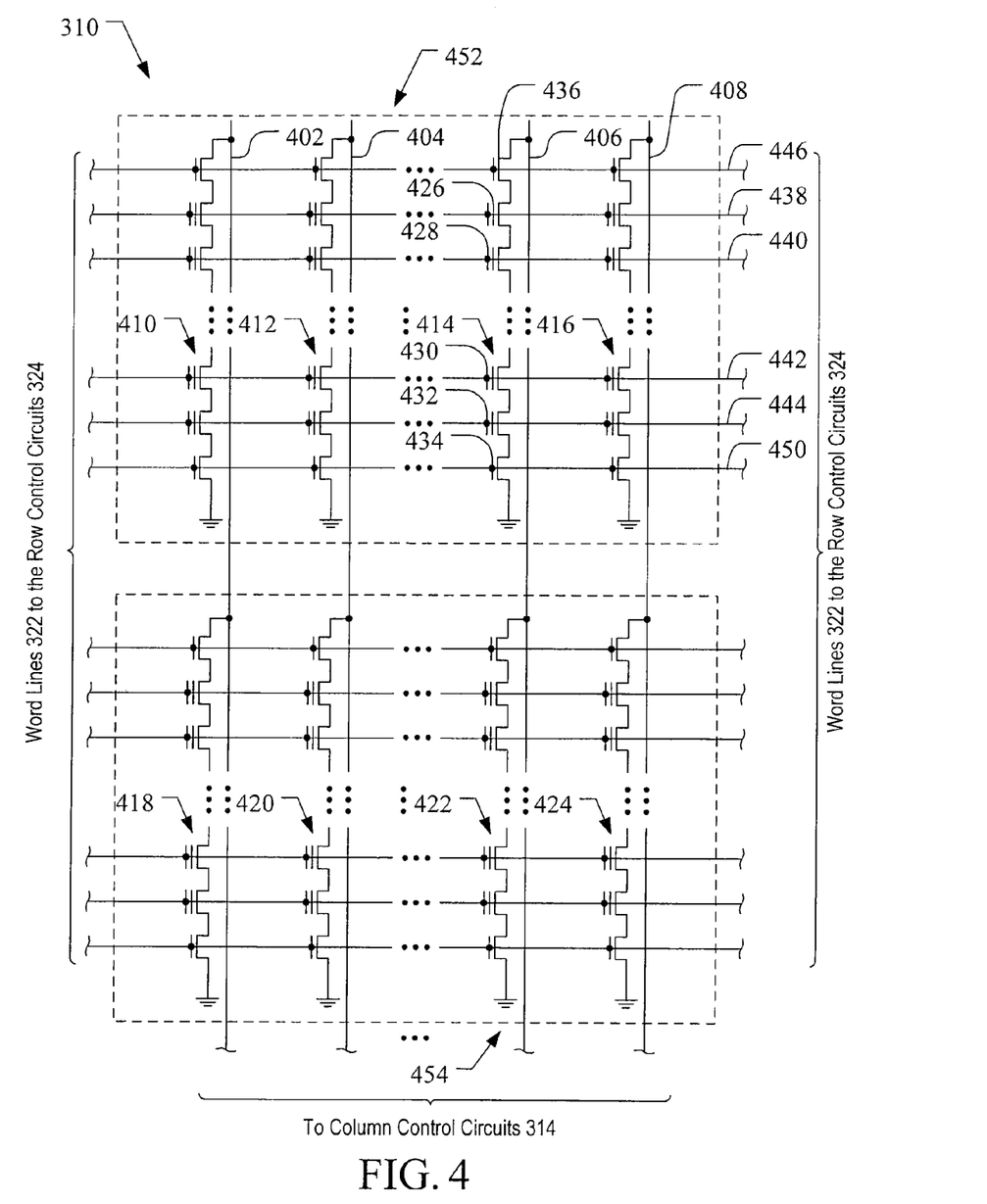
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, may be programmed in parallel at a time. Typically, the rows of a NAND array are programmed in a prescribed order, in this case beginning with the row along the word line 444 closest to the end of the strings connected to ground or another common potential. The row of memory cells along the word line 442 is programmed in parallel next, and so on, throughout the block 452. The row along the word line 438 is programmed in parallel last.

A row of memory cells is merely one example of a parallel programming unit. The parallel programming unit may include one or both of the following: (1) all physical structures (such as memory cells) can be programmed/read in parallel; and (2) all physical structures can be programmed/read with the same or similar completion time. Element (2) is for purposes of efficiency, although not required for a parallel programming unit.

The row of memory of memory cells may be composed of cells that are in the same physical location on a die. Alternatively, the row of memory cells may be composed of cells that are in different physical locations on die or dies that are all programmable in parallel. Moreover, other parallel programmable units are contemplated in which memory cells may be programmed in parallel.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 5:
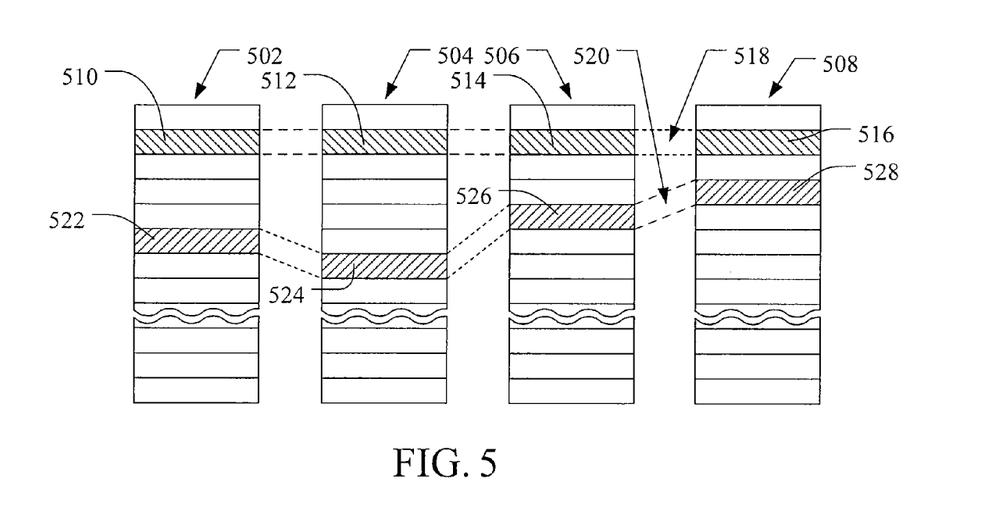
FIG. 5 illustrates an example physical memory organization of the memory bank of FIG. 3.

FIG. 5 conceptually illustrates an organization of one bank 120 of the multi-bank flash memory 116 (FIG. 1) that is used as an example in further descriptions below. Four planes 502-508 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 5 by rectangles, such as blocks 510, 512, 514 and 516, located in respective planes 502-508. There can be hundreds or thousands of blocks in each plane.

As mentioned above, the block of memory cells is the unit of erase, the smallest number of memory cells that are physically erasable together. For increased parallelism, however, the blocks may be operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
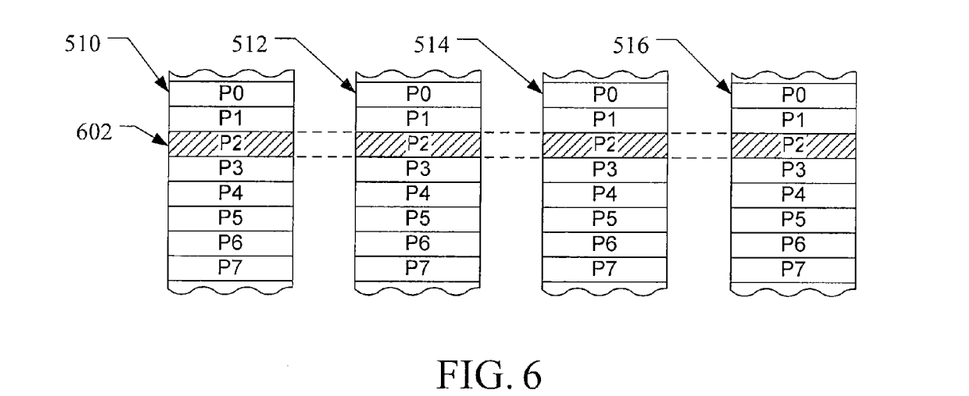
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 16, 32 or more pages of memory cells within each block. The page is the unit of data programming within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks. Within a bank, a metapage is the maximum unit of programming.

As noted above, FIGS. 5-6 illustrate one embodiment of the memory cell arrangement that may exist in one memory bank 120 of the multi-bank memory 116. In one embodiment, regardless of individual memory cell configuration for each bank 120, the memory is broken up into a plurality of physical subarrays that are each mapped to a unique set of host LBA addresses referred to herein as LBA regions.

Referring again to FIGS. 1-2, one example front end 122 is seen in FIG. 1 where the host interface in the front end 122 may include any of a number of known interfaces, such as a serial ATA interface (SATA). The front end 122 may handle caching of data from the host 100 with a volatile or non-volatile cache memory. RAM 212, which may be DRAM, is shown in FIG. 2 and may be used to cache incoming host data. A processor 206 in the front end 122 manages separation and routing of data from the host to the appropriate subarray based on the host LBA addresses that have been preassigned to each subarray. A mapping of the preassigned host LBA addresses and subarrays may be maintained in a table and checked by the front end 122 against host LBA addresses of data arriving from the host or the mapping may be determined by the front end 122 executing an algorithm against the incoming data host LBA addresses to sort the data to the appropriate flash subarray. For example, sequential LBA addresses in the address space at the host interface may be interleaved in bursts amongst individual subarrays. In one implementation, if each burst contains 64 LBA addresses and there are 8 subarrays, address bits 0 to 5 may define an LBA within a page of a subarray and address bits 6 to 8 may define the subarray which should be addressed. The LBA address received at the host interface may be passed directly to the subarray addressed by bits 6 to 8, after bits 6 to 8 have been removed from it.

In addition to the routing of the incoming data to the subarray associated with the host LBA address of the data, the front end 122 is arranged to provide centralized management of the various controllers so that concurrent foreground write operations and background operations such as reclaim (garbage collection) may be coordinated amongst the controllers. The front end 122 may be logic in the same ASIC 208 that houses the controller functions, such as shown in FIG. 2, a collection of one or more discrete circuits, or a combination of the two.

As discussed above, the memory system 102 may perform operations on a parallel programming unit in parallel. The operations may include read operations or write operations. One example of a parallel programming unit is a row of memory cells.

When data is written to flash memory, the data is written, where possible, in units of the maximum parallel programming unit. There are, however, instances when this is not possible and where there is insufficient data to fill the parallel programming unit. In this way, an operation is performed on part, but not all, of the physical data structures in the parallel programming unit. The available data is written in such a way that the data fills as many physical data structures in the parallel programming unit as are needed.

One example of an operation with insufficient data is a cache flushing operation. The host system 100 may send a host flush command that instructs the memory system 102 to write all cached data in volatile memory to flash memory, resulting in the cache flushing operation to write data from the cache to flash memory. Alternatively, the memory system 102 may determine that a cache flush operation be performed. In cache flushing operations, a portion (or all) of the data in the cache is copied from the cache to the main storage area and then removed from the cache to make room for new input data in the cache, or simply to clear the cache as for a host flush command. For example, some, but not all, of the cells in the parallel programming unit are written to in the cache flushing operation. So that, a remainder of the cells in the parallel programming unit are not written to.

In one aspect, a subsequent operation is performed in order to realign programming to the parallel programming unit. For example, when there is insufficient data in the previous write to fill the parallel programming unit (and a part of the parallel programming unit is not written to in the previous write, termed the remainder of the parallel programming unit), the next write to the flash memory fills up to (but not more than) the remainder of the parallel programming unit. In the event that the next write does not fill the remainder of the parallel programming unit, subsequent writes may be repeated until the parallel programming unit is filled. In this way, the next same operation (such as the next write operation) is constrained to fill at most the remainder of the parallel programming unit, thereby realigning the programming of the programming unit. So that, subsequent operations may be performed on the entire parallel programming unit (such as a subsequent write to a different row of memory cells). As discussed above, different parallel programming units (such as different rows of memory cells (i.e., aligned different parallel programming sets)) may have different programming/read times and thus if sub-parts of adjacent sets were merged together, they may not necessarily conform to element (2) of the parallel programming unit (namely, that the physical structures can be programmed/read with the same or similar completion time) and may not even conform to element (1) (namely that the physical structures (such as memory cells) can be programmed/read in parallel).

Figure 7:
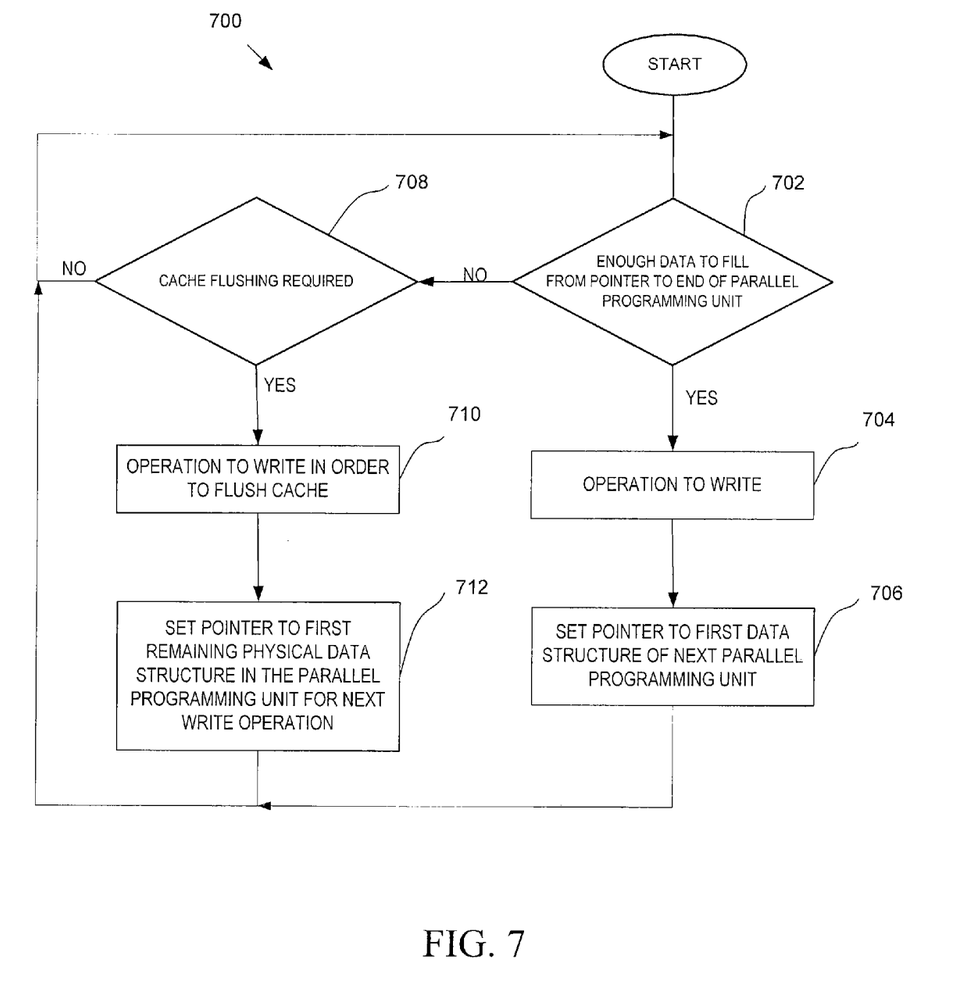
FIG. 7 is a flow chart of a method of writing successively to physical data structures in a parallel programming unit.

FIG. 7 is a flow chart 700 of a method of writing successively to physical data structures in a parallel programming unit. At 702, it is determined whether there is enough data to write from the pointer to the end of the parallel programming unit. In one embodiment, the pointer includes information indicative of where the next write should begin (such as the next cell to program). In the example of the parallel programming unit having a row of cells, the pointer may include information as to the row and column of the cell where the next write should begin. For example, if a previous write filled the parallel programming unit, the pointer may point to the first cell in the row (such as row "X" and column "0", with the column "0" indicating that the entire row is to be programmed). As another example, if a previous write did not fill the parallel programming unit, the pointer may point to a cell other than the first cell in the row (such as row "X" and column "20" indicating that the first 19 cells were programmed in the previous write, and that the remainder of the row (from cell 20 to the end of the row) will fill the parallel programming unit). In an alternate embodiment, the pointer includes information of where the last write was performed.

As discussed above, at 702, it is determined whether there's enough data to write from the pointer to the end of the parallel programming unit (regardless of whether or not the pointer is pointing at the first cell in the row). If there is enough data to write, at 704, an operation to write is performed. At 706, the pointer is then set to the first data structure (such as the first cell) of the next parallel programming unit. Alternatively, the pointer may be set to the last data structure written to. The pointer thus indicates that the next write is to program the entire parallel programming unit.

If it is not determined that there's enough data to write from the pointer to the end of the parallel programming unit, at 708, it is then determined whether cache flushing is required. As discussed above, one operation is a cache flushing operation, which results from receiving a host flush command to immediately clear some (or all) of the cache in the memory system 102. At 710, an operation to write in order to flush the cache is performed. The writing of data in a cache flushing operation may fill more than one parallel programming unit (such as more than one row of memory cells). In this way, one of the parallel programming units may not be entirely filled with data (termed the unfilled parallel programming unit or a remainder of the parallel programming unit). At 712, the pointer is set to the first remaining physical data structure in the parallel programming unit. Thus, the pointer indicates the physical data structure (such as the cell) that is to be first programmed at the next write. In the above example, if the write for the cache flush operation results in the first 19 cells of the current parallel programming unit being filled, the pointer will point to the $20^{th}$ cell to indicate that this is the cell to begin the next write operation. In this way, due to the pointer pointing to the $20^{th}$ cell, the next write operation limits the write so that, at most, the remainder of the unfilled parallel programming unit is filled (e.g., from the $20^{th}$ cell to the end of the row in the parallel programming unit). Alternatively, the pointer may point to the $19^{th}$ cell (the last cell written to) to indicate that the next cell (the $20^{th}$ cell) is the next cell to be written to. Thus, if the operation does not fill at least one of the parallel programming units, a realignment operation may be performed. One type of realignment operation is to perform one (or multiple) write operations to fill the remainder of the unfilled parallel programming unit with data before other parallel programming units are written to.

If there is not enough data to fill from the pointer to the end of the programming unit and cache flushing is not required, the flow chart 700 loops back to 702 to wait. For example, the flow chart may wait until enough data is stored in temporary storage to fill from the pointer to the end of the programming unit or until a cache flush is required. In certain instances, the next write operation will fill the remainder of the unfilled parallel programming unit (e.g., if the pointer does not point to the first cell in the parallel programming unit). In other instances, the next write operation will not fill the remainder of the unfilled parallel programming unit (such as if another cache flush is required), so that the flow chart will iterate through until the unfilled parallel programming unit is filled.

It is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order and not necessarily in the order in which they are recited.

I claim:

1. A method of performing operations on a parallel programming unit in a memory system, the method comprising the memory system:
   performing a first operation on the parallel programming unit, the parallel programming unit comprising multiple physical structures configured to be operated on in parallel, the first operation operating on only some of the multiple physical structures in the parallel programming unit and not operating on a remainder of the parallel programming unit;
   setting a pointer to indicate at least one physical structure in the remainder of the parallel programming unit; and
   performing a second operation using the pointer to operate on no more than the remainder of the parallel programming unit by writing only to memory cells in a row, as indicated by the pointer, from a column, as indicated by the pointer, to an end of the row.

2. The method of claim 1, wherein the first operation comprises a cache flushing operation.

3. The method of claim 1, wherein the parallel programming unit comprises a row of memory cells.

4. The method of claim 3, wherein the pointer indicates a first cell not operated on in the first operation.

5. The method of claim 4, wherein the column of the pointer indicates a number of the remainder of the parallel programming unit.

6. The method of claim 1, wherein the first operation and second operation are write operations.

7. The method of claim 6, further comprising iteratively writing, after performing the second operation, to the remainder of the parallel programming unit until all of the remainder is written to.

8. The method of claim 1, wherein the parallel programming unit comprises all physical structures in the memory system that can be programmed or read in parallel and can be programmed or read with a same or similar completion time.

9. A storage device comprising:
   a non-volatile memory comprising parallel programmable units, the parallel programming units comprising multiple physical structures configured to be operated on in parallel; and
   a controller in communication with the non-volatile memory, the controller configured to:
      perform a first operation on the parallel programming unit, the first operation operating on only some of the multiple physical structures in the parallel programming unit and not operating on a remainder of the parallel programming unit;
      set a pointer to indicate at least one physical structure in the remainder of the parallel programming unit; and
      perform a second operation using the pointer to operate on no more than the remainder of the parallel programming unit by writing only to memory cells in a row, as indicated by the pointer, from a column, as indicated by the pointer, to an end of the row.

10. The storage device of claim 9, wherein the first operation comprises a cache flushing operation.

11. The storage device of claim 9, wherein the parallel programming unit comprises a row of the memory cells.

12. The storage device of claim 11, wherein the pointer is configured to indicate a first cell not operated on in the first operation.

13. The storage device of claim 12, wherein the column of the pointer is configured to indicate a number of the remainder of the parallel programming unit.

14. The storage device of claim 13, wherein the first operation and second operation are write operations.

15. The storage device of claim 14, wherein the controller is further configured to iteratively write, after performing the second operation, to the remainder of the parallel programming unit until all of the remainder is written to.

16. The storage device of claim 9, wherein the parallel programming unit comprises all physical structures in the memory system that can be programmed or read in parallel and can be programmed or read with a same or similar completion time.

* * * * *